United States Patent [19]
Kino

[11] 3,944,732
[45] Mar. 16, 1976

[54] METHOD AND APPARATUS FOR IMPROVING ACOUSTO-ELECTRIC SCANNING

[75] Inventor: Gordon S. Kino, Stanford, Calif.

[73] Assignee: The Board of Trustees of the Leland Stanford University, Stanford, Calif.

[22] Filed: Feb. 12, 1975

[21] Appl. No.: 549,380

[52] U.S. Cl. .................. 178/7.1; 178/7.6; 310/9.8; 310/8.1
[51] Int. Cl.[2]... H04N 3/16; H04N 3/00; H01V 7/00
[58] Field of Search............... 178/7.6, 7.1, DIG. 18; 310/9.8, 8.1; 333/30 R, 72

[56] References Cited
UNITED STATES PATENTS

| 3,505,572 | 4/1970 | Yamashita et al. | 310/8.1 |
| 3,665,225 | 5/1972 | Van den Heuvel et al. | 310/8.1 |

*Primary Examiner*—George H. Libman
*Assistant Examiner*—R. John Godfrey
*Attorney, Agent, or Firm*—Flehr, Hohbach, Test, Albritton & Herbert

[57] ABSTRACT

An acoustically scanned, optical imaging system for converting patterns of light into electrical signals. The system includes a monolithic convolver that scans incident light patterns using two counter propagating acoustic waves. Located in front of the convolver is an opaque grid that places a spatial periodicity into the light patterns. When the frequencies of the two acoustic waves propagating in the convolver are selected so that the difference between them is a function of the spatial periodicity placed in the light patterns, the minimum threshold signal or dark current from the convolver is substantially reduced. The imaging system also includes four alternative signal generating and processing circuits that can provide a one dimensional scan, a fast Fourier transform and a Fresnel transform of the light patterns incident on the convolver. Patterns of colored light also can be convolved into electrical signals by using colored filters as the grid.

37 Claims, 14 Drawing Figures

| SIGNALS ON SURFACE ACOUSTIC WAVE LINE | | IMAGE OBTAINED |
|---|---|---|
| SCAN (S) INPUT | READ (R) INPUT | |
| SHORT PULSE | LONG PULSE FIG. 4 | ONE DIMENSIONAL SCAN |
| LINEAR FM CHIRP | FM CHIRP OF OPPOSITE SIGN FIG. 1 | FOURIER TRANSFORM ARBITRARY OUTPUT BANDWIDTH IMPROVEMENT IN S/N |
| LINEAR FM CHIRP | LONG PULSE OR CHIRP OF DIFFERENT SLOPE FIG. 7 | FRESNEL TRANSFORM IMPROVEMENT IN S/N SCAN VELOCITY SLOWED |

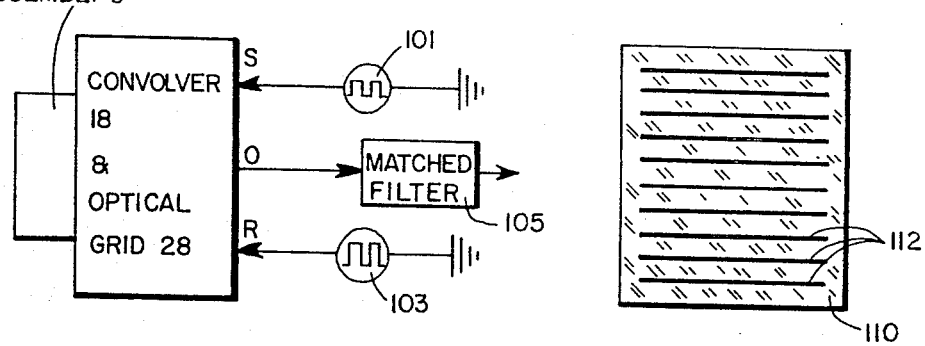
FIG. 9
FIG. 11
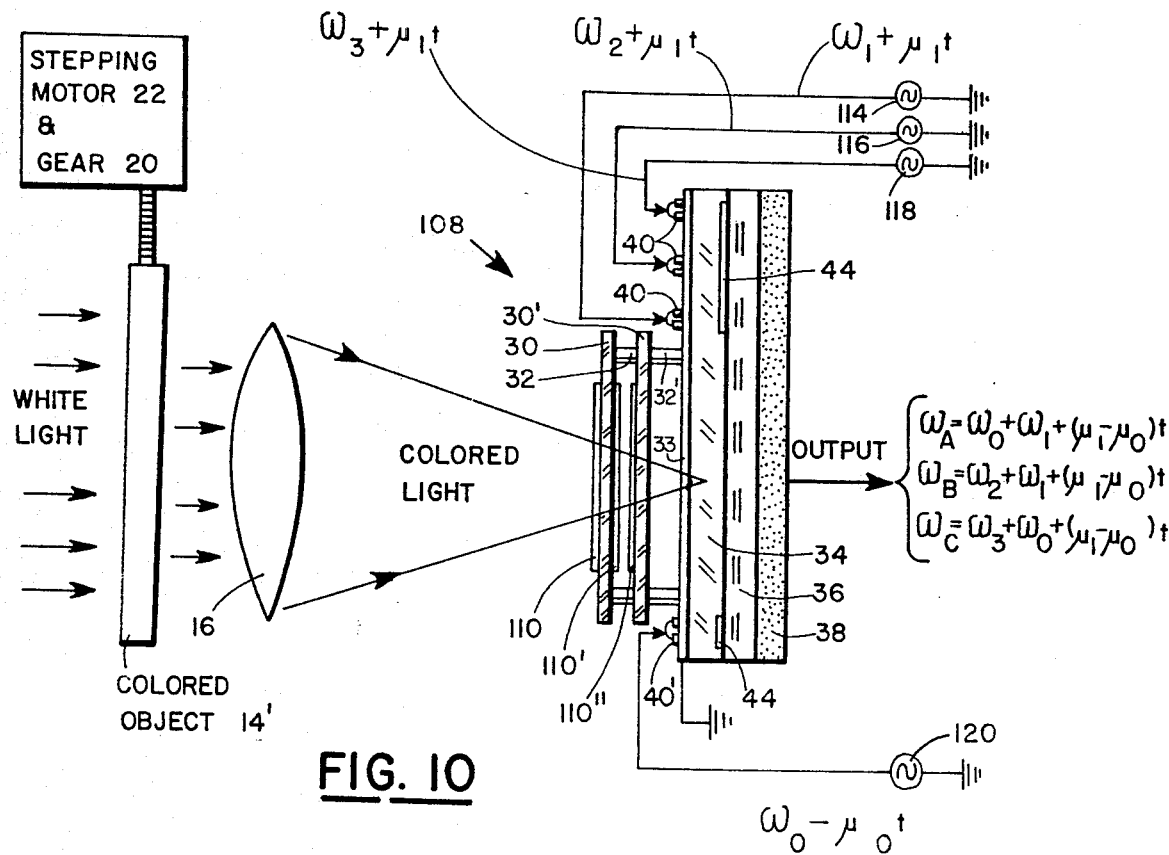
FIG. 10

METHOD AND APPARATUS FOR IMPROVING ACOUSTO-ELECTRIC SCANNING

GOVERNMENT CONTRACT

The invention described herein was made in the performance of work under a contract with the National Science Foundation, Contract No. GK 24635.

BACKGROUND OF THE INVENTION

1. Field of the Invention

The present invention generally relates to ultrasonic sound systems and, more particularly, to systems for acoustically scanning optical images.

2. Description of the Prior Art

A general introduction to this field of technology can be found in an article entitled "Acoustic Surface Waves" written by Mr. G. S. Kino and Mr. H. J. Shaw and published in the "Scientific American", October 1972, Vol. 227, No. 4 at page 51.

The initial developement of acoustically scanned optical imaging systems was carried out by Mr. C. F. Quate. This early work disclosed that when a photosensitive semiconductor body was placed close to the surface of a piezoelectric acoustic surface wave delay line, a pattern of illumination incident on the semiconductor body caused a corresponding change in the interaction between an acoustic surface wave in the delay line and the electrons in the semiconductor body.

A more recent development has been the use of a convolver incorporating a lithium niobate ($LiNbO_3$) surface wave delay line separated by an air gap from a silicon (Si) semiconductor body. The air gap is used to prevent the lithium niobate from mechanically stressing the silicon body during operation. The development and use of lithium niobate convolvers is further described in the following articles and patents:

U.S. Pat. Nos. 3,826,865 and 3,826,866 entitled "Method for Acousto-Electric Scanning" issued to Mr. C. F. Quate et al. and assigned to the Board of Trustees of Leland Stanford Junior University.

N. J. Moll, O. W. Otto, and C. F. Quate, "Scanning Optical Patterns with Acoustic Surface Waves", J. de Physique, 33, Colloque C-6, Supplement, pp. 231–234 (November-December 1972).

C. F. Quate, "Optical Image Scanning with Acoustic Surface Waves", pending publication in the IEEE Transactions on Sonics and Ultrasonics.

S. Takada, H. Hayakawa and N. Mikoshiba, "Surface-Wave-Acoustoelectric Image Scanner", Proceedings of the 5th Converence (1973 International) on Solid State Devices, pp. 194–198, 1973.

The parametric interaction between the two counter propagating surface waves in a delay line and the theory of operation of convolvers is described in an article entitled "Signal Processing by Parametric Interactions in Delay-Line Devices" written by Mr. G. S. Kino et al. and published in IEEE Transactions on Microwave Theory and Techniques, Vol MTT-21, No. 4, April 1973, pp. 244–255. This article also refers to the development of monolithic convolvers.

Heretofore, one problem experienced with lithium niobate convolvers has been maintaining the uniformity of the spacing between the semiconductor body and the lithium niobate. This spacing across the air gap usually has a thickness of from one thousand angstroms to one micron. In most practical applications it is difficult to prevent the lithium niobate from deforming the infintesimal amount necessary to destroy the uniformity of the air gap. The problem is further compounded because the air gap itself prevents the convolver from being mechanically rigid and flexure resistant. In addition, random charges of electrons or ions tend to collect on the outside surfaces of the lithium niobate and the semiconductor body and can destroy the uniformity of the interaction.

One problem heretofore experienced with convolvers has been the large, continuous, minimum signal output occurring during operation. This large, minimum output is called the dark current because convolvers generate this large signal even when there is no incident illumination and the convolver is located in the dark. The dark current is generated because the two counterpropagating acoustic waves are mixed together within the convolver and produce a combined output signal. The illumination incident on the convolver merely varies this pre-existing output signal level.

Another difficulty with these prior convolvers has been their limited dynamic range. At the high end of the range the maximum output signal occurs when there is so much incident light that the convolver saturates and produces a continuous high level output. At the low end of the range the dark current described hereinbefore comprises the minimum, low level signal output. Any signal weaker than the dark current is buried in the low level output and is not observable. Since the dark current is indistinguishable from a signal level produced by ordinary incident illumination, there has been heretofore no desirable way to lower the minimum signal level and thereby increase the dynamic range of the system.

Lastly, there has always been a continuing need to find devices that will convert patterns of light into electrical signals and, in particular, to discover systems to perform fast Fourier and Fresnel transforms of these light patterns in real time. Further, there has always been a need to develop devices that will transform patterns of light into electrical signals with a nondestructive readout.

OBJECTS AND SUMMARY OF THE INVENTION

The present invention includes a monolithic convolver for acoustically scanning an optical image. The monolithic convolver combines a photosensitive semiconductor body, an intermediate layer, and a piezoelectric substrate together into a mechanically rigid, unitary sandwich. The present invention also includes an opaque grid located in front of the semiconductor body for placing a spatial periodicity into the illumination incident on the convolver. When the frequencies of the two acoustic waves propagating in the convolver are selected so that the difference between them is a function of the spatial periodicity in the incident illumination, the dark current in the output of the convolver is substantially reduced. Moreover, there is an observable output signal only when there is illumination incident on the convolver. The present invention further includes four alternative signal generating and processing circuits that provide a one dimensional scan, a fast Fourier transform, and a Fresnel transform of the optical image. In addition, the present invention contemplates using colored filters as the grid and obtaining electrical signals from the convolver corresponding to the colors in the image incident on the convolver.

3

The primary object of the present invention is to provide a method and apparatus that overcomes the disadvantages and difficulties heretofore experienced in the prior art.

An additional object of the present invention is to provide an acoustically scanned, optical imaging device that is mechanically rigid and not subject to the problems stemming from maintaining a uniform air gap thickness.

A further object of the present invention is to eliminate or at least to reduce the dark current from the output of acoustically scanned optical convolvers.

Another object of the present invention is to increase the dynamic range of acoustically scanned, optical imaging devices.

Still another object of the present invention is to develop a device that will perform a fast Fourier transform, a Fresnel transform and a digital transform of an optical image in real time.

An additional object of the present invention is to improve the signal to noise ratio of acoustically scanned optical imaging convolvers. A further object of the present invention is to use colored filters as grids and to obtain electrical signals from a convolver corresponding to the colors in the image incident on the convolver.

Additional objects and features of the invention will appear from the following description in which the preferred embodiments have been set forth in detail in conjunction with the accompanying drawings.

BRIEF DESCRIPTION OF THE DRAWINGS

FIG. 9 is a schematic diagram of a fourth signal generating and processing circuit using coded signals for the counter-propagating waves and a matched filter to obtain a one dimensional scan of the image of the object;

FIG. 10 is a schematic diagram of an acoustically scanned, optical imaging, monolithic convolver having a plurality of colored filter-grids for generating electrical signals corresponding to the colors in the image incident on the convolver;

FIG. 11 is a end view of one of the filter-grids of FIG. 10;

DESCRIPTION OF THE PREFERRED EMBODIMENTS

Description of the Monolithic Convolver

Figure 1:
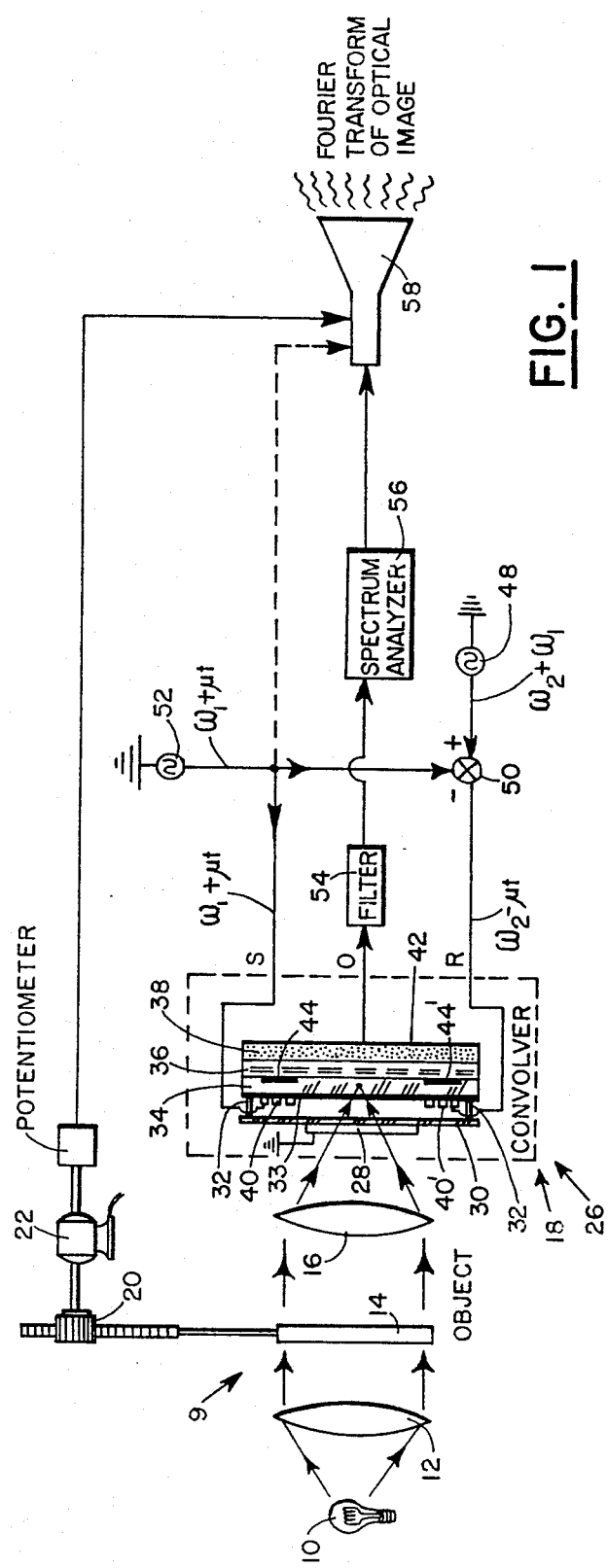
FIG. 1 is a schematic diagram of an acoustically scanned, optical imaging, monolithic convolver and a signal generating and processing circuit for generating a Fourier transform in real time of the optical image of the object.

Referring to FIG. 1, reference numeral 9 indicates an illuminating assembly including an incandescent light source 10 that supplies illumination for an acoustoelectric scanning system described hereinafter. The illumination from the light source is incident on a first, simple, biconvex lens 12. This first lens refracts the rays from the light source into a parallel beam and directs the light toward an object 14 that is optically imaged by the system. The object in FIG. 1 is a photographic transparency and can be either a black and white negative or a colored slide. The light passing through the object is focused by a second biconvex lens 16 onto a convolver 18 hereinafter described. The object 14 is vertically moved by a rack and pinion gear 20 so that the image of object can be vertically scanned. The pinion gear is turned by a stepping motor 22 and the vertical position of the object is measured by a potentiometer 24 attached to the shaft of the stepping motor. The output of the potentiometer is an electrical signal indicating the vertical position of the object with respect to the convolver 18.

Figure 3:
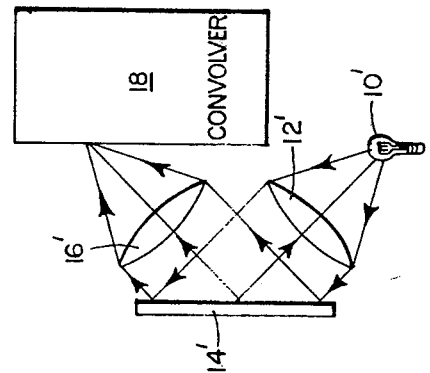
FIG. 3 is a schematic diagram of an alternative illuminating assembly for reflecting light off of the object and onto a convolver.

Referring to FIG. 3, the convolver 18 can also be illuminated by reflecting light off of an object 14' such as a page of printed text. The illumination from the light source 10' is directed through the lenses 12', 16' in the same manner as hereinbefore described. The printed page is imaged line by line by moving the page past the convolver.

It should be noted that reference numeral 18 is used to indicate the general type of convolver that is acoustically scanned and optical imaging. This type of convolver is operable with any type of electromagnetic radiation from any source as long as the radiation causes conductivity perturbations in the semiconductor body as hereinafter described. The convolver illustrated in FIGS. 1 and 2 and identified by reference numeral 26 is a monolithic convolver formed in a multilayered sandwich. The monolithic convolver forms a mechanically rigid unit that resists deformation and flexure.

The monolithic convolver 26 includes an optical grid 28 that performs as an opaque mask. The grid consists of a plurality of uniformly spaced apart elements each having a spacing of distance L. These elements block the light coming from the second biconvex lens 16 and place periodicity in the light before the light reaches the semiconductor body. The grid can be fabricated from any opaque material including metals such as aluminum and gold; however, when conductive materials are used, the grid should be grounded. In the embodiments actually constructed the grid spacing varied between 50 to 100 microns.

The grid 28 is supported by a transparent sheet 30 that overlies the monolithic convolver. The transparent sheet can be fabricated from any material that is transparent to the incident light including gold foil, vacuum evaporated polysilicon, and tin oxide. The grid 28 and the transparent sheet 30 are in turn both supported and spaced away from the convolver sandwich by two elongate spacers 32. The spacers position the grid sufficiently far away from the sandwich so that the grid does not influence either the acoustic waves traveling in the piezoelectric layer hereinafter described or the electric fields associated therewith. It should be noted, too, that the grid must be positioned sufficiently close to the sandwich so that the periodicity is not washed out of the light before it reaches the semiconductor body. Parenthetically, if these grid locating criteria are satisfied, the grid can be located within the convolver sandwich in front of the semiconductor body. The exact height of the spacers is not a critical dimension, and it has been observed that maintaining a uniform thickness between the grid and the convolver sandwich is not required. In one embodiment that was constructed, spacers having a height of between 100 microns to 1 millimeter were found to be satisfactory.

The multilayered sandwich of the monolithic convolver 26 includes a piezoelectric layer 34 located directly behind the transparent sheet 30 and the grid 28. The piezoelectric layer is transparent to the illumination coming from the light source 10 and provides the piezoelectric coupling between the two counterpropagating acoustic surface waves and the semiconductor body as hereinafter described. Located on top of the piezoelectric layer 34 is a thin, transparent metal film 33 that is connected to ground. This metal film provides one leg of the output signal circuit hereinafter described. In the preferred embodiment the piezoelectric layer is made of zinc oxide (ZnO) that has been sputtered onto the sandwich. It has been observed that the layer should have a thickness of approximately 0.05 times the wavelength of the incident light, i.e. $t = 0.05\lambda$. Although this layer can also be fabricated from aluminum nitride and cadmium sulfide, for the purposes of brevity the piezoelectric layer will hereinafter be referred to as the zinc oxide layer. In the embodiment that was constructed to operate at 130 megahertz, the zinc oxide layer was approximately 1.2 microns thick.

Figure 2:
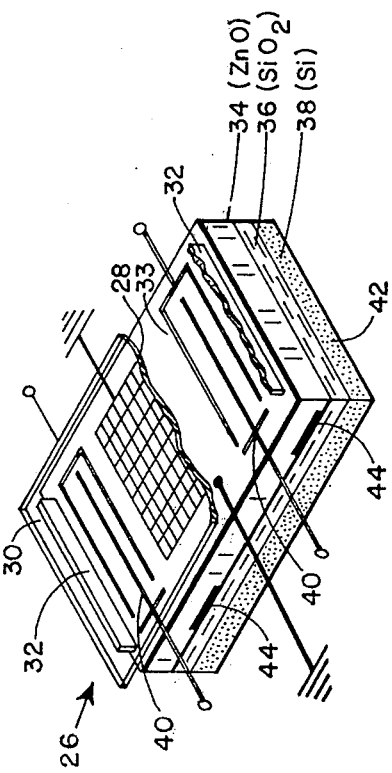
FIG. 2 is a perspective view, partially cut away, of the monolithic convolver of FIG. 1.

Underlying the piezoelectric layer 34 and forming part of the convolver sandwich is a photosensitive semiconductor body 38. In the preferred embodiment the semiconductor body is made of silicon (Si) and, for brevity, will be hereinafter referred to as the silicon layer. However, this layer can be fabricated from indium antimonide (InSb) for sensitivity in infrared light and gallium arsenide (GaAs) for visible light. The silicon layer is the basic substrate of the sandwich and includes an N layer of silicon epitaxially grown on bulk N+ silicon to provide good conduction to the N layer. In FIG. 2 the N layer is located proximate to zinc oxide layer 34. The silicon layer is a photosensitive, variable charge density material that produces conductivity perturbations corresponding to the intensity variations of the light incident on the convolver. In the embodiment that was actually constructed, commercially available N+ phosphorous doped silicon was used. The N layer was approximately 2 microns thick and the silicon was cut so that the phase velocity and group velocity of the acoustic waves were colinear.

Located between the zinc oxide layer 34 and the silicon layer 38 is an intermediate layer 36. The intermediate layer protects the exposed surface of the silicon layer from zinc oxide contamination during fabrication. In addition, the intermediate layer both provides a virgin surface on which to grow the zinc oxide layer and also provides a low density of surface states at the surface of the silicon layer. In the embodiment actually constructed, the intermediate layer comprised a layer of silicon dioxide approximately 1,000 angstroms thick. It has also been observed that the silicon dioxide layer itself can be protected from contamination by placing a layer of silicon nitride or phosphorous glass approximately 1,000 angstroms thick between the silicon dioxide layer and the zinc oxide layer. For the purposes of brevity the intermediate layer 36 will hereinafter be referred to as the silicon dioxide layer.

On the exposed surface of the zinc oxide layer 34 at either end thereof is located an interdigital transducer 40. The zinc oxide layer forms an acoustic surface wave delay line and the interdigital transducers are input electrodes that can be driven to generate acoustic surface waves in the zinc oxide layer. The construction and operation of both interdigital electrodes and acoustic surface wave delay lines are further described in the "Scientific American" article cited hereinbefore.

Directly underlying each interdigital transducer 40 and located on top of the silicon dioxide layer 36 is a gold shielding pad 44. The gold pads are the same size as the interdigital transducers and insulate the driving signal at the transducer so that the signal does not penetrate into the silicon layer 38. The shielding pads thus reduce the driving signal loss and optimize the efficiency of the transducers. The pads are vacuum evaporated onto the silicon dioxide. Care must be taken to keep the gold crystallites of the film well aligned with their [1,1,1,] surfaces pointing upwardly. This is done by fast evaporation on top of a Ti flash. The purpose is to provide a good surface on which to grow well aligned ZnO, that is with the C-axes of the crystallites normal to the Si surface. Such ZnO will have a piezoelectric coupling coefficient comparable to a perfect crystal.

There is an output electrode 42 located on the exposed surface of the silicon layer 38. The output electrode is a metal film vacuum evaporated onto the N+ layer of silicon and has approximately the same dimensions as the acoustic surface wave delay line hereinbefore described. In the embodiments actually constructed, the output electrode 42 was either an aluminum film or gold film of the order of 50–200 angstroms thick so as to be transparent to light.

The sandwich of the monolithic convolver 36 is fabricated using semiconductor production techniques. The silicon substrate 38 is cut from a piece of commercially available, bulk N+ phosphorous doped silicon and the N layer is grown epitaxially on the substrate by chemical vapor deposition. Immediately after the N layer is formed, the exposed surface is oxidized and a layer of silicon dioxide approximately one thousand angstroms thick is grown on top. Next, the gold shielding pads 44 are laid down on top of the silicon dioxide layer 36 by vacuum evaporation. The silicon dioxide layer 38 can also be protected by layers of silicon nitride or phosphorous glass grown by chemical vapor deposition. Thereafter, the zinc oxide layer 34 is RF sputtered on to the sandwich and the interdigital transducers 40 are deposited on top of the zinc oxide layer so that each transducer overlies a corresponding gold pad. Lastly, the transparent metal film 33 is placed on the zinc oxide layer.

Referring to FIG. 1, the monolithic convolver 26 is driven by a conventional signal generator 48 having an output of frequency $\omega_1 + \omega_2$. This output from the signal generator 48 is passed to a mixer 50. In addition, the monolithic convolver is also driven by a chirp generator 52 having an output of frequency $\omega_1 + \mu t$, where $\omega_1$ is the continuous frequency component of the signal and $\mu t$ is a chirp signal having a chirp rate of $\mu$ over time $t$. A chirp signal is a signal that varies in frequency as a function of time. The signal $\omega_1 + \mu t$ from the chirp generator 52 is applied directly to the interdigital transducer 40 and is also identified hereinafter as a scan pulse (S). The signal $\omega_1 + \mu t$ from the chirp generator 52 is also passed to the mixer 50 where the signal is subtracted from the output $\omega_1 + \omega_2$ of the signal generator 48. The resulting output signal from the mixer 50 is $\omega_2 - \mu t$ and is identified hereinafter as a read pulse (R). The read pulse is applied to the interdigital transducer 40'. In summary, two linear FM chirp signals, $\omega_1 + \mu t$ and $\omega_2 - \mu t$, are inserted into the opposite ends of the convolver 26.

Operation of the Monolithic Convolver

In operation, the illumination from the light source 10 passes through the object 14 and a pattern of light is obtained therefrom. The image of the object is focused on the convolver 26 by the lens 16, and the grid 28 places a spatial periodicity in the light. Next, the light passes through both the transparent sheet 30 and the transparent piezoelectric layer 34 and is thereafter incident on the semiconductor body 38. Since the semiconductor body is optically sensitive, the incident light changes the electrical conductivity of the silicon layer 38. Simultaneously, the piezoelectric layer 34 is driven by the two linear FM chirp signals, $\omega_1 + \mu t$, $\omega_2 - \mu t$ generated by the two interdigital transducers 40. Each transducer generates a counter propagating acoustic wave that travels down the piezoelectric layer.

Within the semiconductor body the pattern of light generates corresponding perturbations in the electron charge density. Since the piezoelectric layer 34 is placed so close to the semiconductor body, there is a corresponding change in the interaction between the acoustic surface waves and the perturbated electron charge density in the semiconductor body. In other words, as each acoustic wave travels along the piezoelectric layer 34 at the acoustic wave velocity, the wave senses any change in the electron carrier density in the semiconductor resulting from local variations in the intensity of the illumination incident on the semiconductor body.

More specifically, there is an electric field associated with each acoustic wave that propagates along the zinc oxide layer 34, and this electric field interacts with the perturbated charge carriers in the semiconductor body. As the acoustic wave passes proximate to the semiconductor body, the electric field E normal to the surface of the semiconductor produces a depletion layer of thickness $l$ where $E = qN_d l/\epsilon$, and $N_d$ is the donor density of an n type semiconductor, $q$ the electronic charge and $\epsilon$ the permittivity of the semiconductor.

In turn, there is a potential $\phi$ developed across the depletion layer where:

$$\phi = qN_d l^2 /2\epsilon$$

or $$\phi = \frac{\epsilon E^2}{2qN_d}$$

Thus, when the electric field E is supplied across the surface of the semiconductor body, a potential is developed across the depletion layer that is proportional to the square of the electric field.

The action of the grid may be best understood by considering first the interaction when the chirp rate, $\mu$, equals zero. In this case two signals $\omega_1$ and $\omega_2$ are inserted into the opposite ends of the zinc oxide layer 34. The acoustic waves counter propagate in the system and have electric fields that vary as $\exp j\,[\omega_1 t - k_2 z]$ and $\exp j\,[\omega_2 t + k_2 z]$ where $$k_1 = \frac{\omega_1}{v}, \quad k_2 = \frac{\omega_2}{v}$$

and $v$ is the acoustic surface wave velocity.

As hereinbefore described, the optical grid 28 imparts a periodic spatial modulation to the intensity of the light incident along the length of the semiconductor layer 38. In effect, the grid introduces a Fourier component with an effective wave number K into the electron charge carrier density of the semiconductor body 66. In order to obtain an output (O) from the convolver corresponding to the image of the object 14, the propagation constants $K_1$, $K_2$ of the two input waves R, S must be chosen that $$K_1 - K_2 \pm K = 0$$

or $$K_1 - K_2 = \frac{2\pi}{L}$$

where $L$ is the spacing between the elements of the grid 28. This requirement means that the frequencies of the scanning and reading input signals must be altered so that $$\omega_1 - \omega_2 \pm kv = 0$$

or $$(\omega_1 - \omega_2) \frac{l}{v} = 2\pi$$

Thus, an output signal (O) is obtained from the convolver at the sum frequency $(\omega_1 + \omega_2) = 2\omega_1 \pm Kv$ only when there is light incident on the convolver. In the dark or when there is no incident light, the output signal is very small because the propagation constants $K_1$, $K_2$ of the acoustic waves are not matched. In short, by using the optical grid 28 and by properly selecting the scanning and reading frequencies, the dark current can be substantially eliminated.

It should be noted, also, that the monolithic convolver 26 is operable without the optical grid 28. The convolver then operates in much the same manner as the lithium niobate convolvers described in the references cited hereinbefore.

Signal Processing Circuit Providing a Fourier Transform

Referring to FIG. 1, the output signal (O) obtained at the output electrode 42 of the convolver is passed to a conventional high pass filter 54. The high pass filter eliminates the leakage frequencies $\omega_1 + \mu t$ and $\omega_2 - \mu t$ from the output signal. The device is used with the grid whose action is the same as for constant frequency signals. The output signal from the filter is $\omega_1 + \omega_2$ modulated by the Fourier transform of the image of the object. This signal output is passed to a conventional spectrum analyzer 56 that displays the amplitude of the signal as a function of frequency. The output of the spectrum analyzer, in turn, is used to intensity modulate an oscilloscope 58. The horizontal sweep of the oscilloscope is triggered by the leading edge of the chirp signal $\mu t$ generated by the chirp generator 52. The vertical input to the oscilloscope is obtained from the position signal of the object 14 obtained from the potentiometer 24 on the stepping motor 22 hereinbefore described.

The visual output of the oscilloscope is the Fourier transform of the optical image of the object 14. This can be shown as follows:

Assuming that the two input signals are $\omega_1 + \mu t$, $\omega_2 - \mu t$ and their phases are $$\omega_1 t + \frac{\mu t^2}{2}, \quad \omega_2 t - \frac{\mu t^2}{2},$$

then at the plane Z (neglecting additive constants) the signals are of the form:

$$\exp j \left[ \omega_1 \left( t - \frac{z}{v} \right) + \frac{\mu}{2} \left( t - \frac{z}{v} \right)^2 \right]$$

$$\exp j \left[ \omega_2 \left( t + \frac{z}{v} \right) - \frac{\mu}{2} \left( t + \frac{z}{v} \right)^2 \right]$$

respectively.

When the semiconductor is illuminated through a grating, the grating introduces a periodicity into the illumination whose fundamental component can be expressed as $\cos 2\pi z/l$. The output is of the form $$F(t) = A \int n(z) \cos \frac{2\pi z}{l} e^{j \left[ \omega_1 \left( t - \frac{z}{v} \right) + \frac{\mu}{2} \left( t - \frac{z}{v} \right)^2 \right]} \times e^{-j \left[ \omega_2 \left( t + \frac{z}{v} \right) - \frac{\mu}{2} \left( t + \frac{z}{v} \right)^2 \right]} dz$$

where $n(z)$ is the carrier density variation due to illumination

Rewriting $$F(t) = A \int n(z) \cos \frac{2\pi z}{l} e^{j(\omega_1 + \omega_2)t} e^{j(\omega_1 - \omega_2)z/v} \times e^{2j \frac{\mu t z}{v}} dz$$

The periodicity $\cos$ $$\frac{2\pi z}{l} = \frac{e^{2j\pi z/l} + e^{-2j\pi z/l}}{2}$$

and choosing $$\frac{\omega_1 - \omega_2}{v} = \frac{2\pi}{l}$$

from $$k_1 - k_2 = \frac{2\pi}{l}$$

as was used for the constant frequency assumption with the use of a grid.

Keeping only the contribution due to the $e^{2j\pi z/l}$ term, then $$F(t) = e^{j(\omega_1 + \omega_2)t} \int n(z) e^{j \frac{\mu t z}{v}} dz$$

Thus, the output is a carrier $e^{j(\omega_1 + \omega_2)t}$ modulated by the Fourier transform of $n(z)$.

Lithium Niobate Convolver

Figure 4:
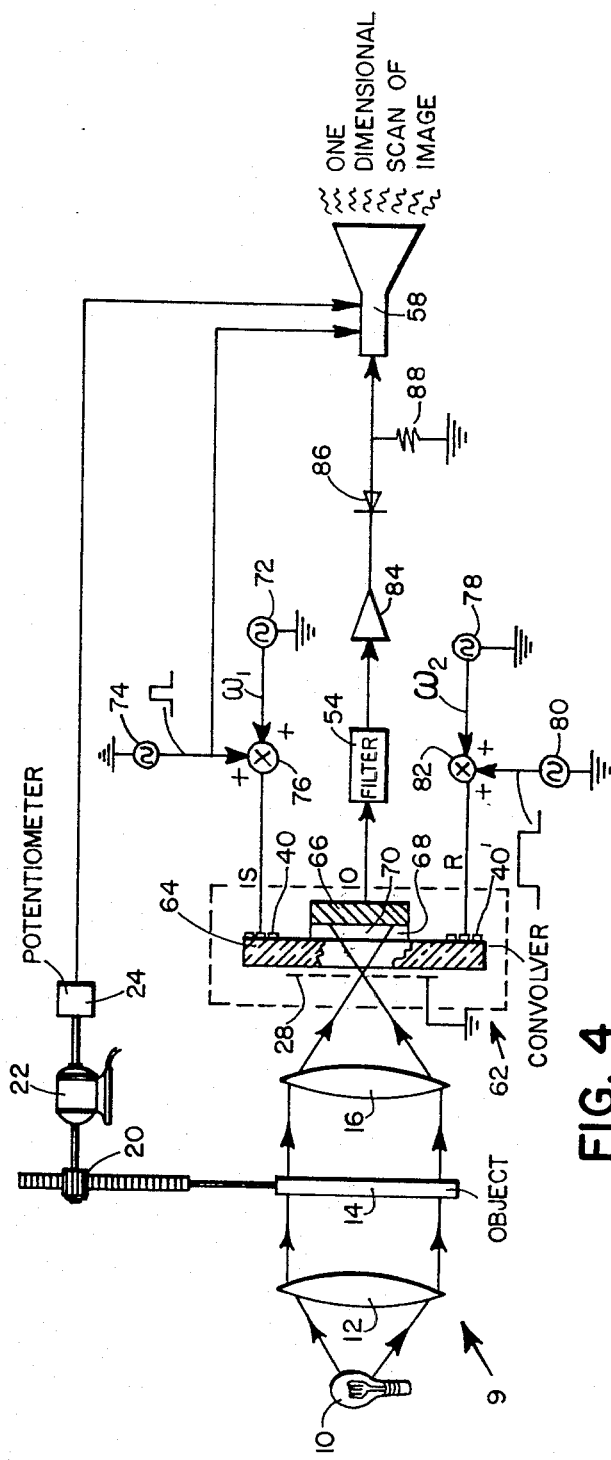
FIG. 4 is a schematic diagram of an acoustically scanned, optical imaging, lithium niobate convolver and a second signal generating and processing circuit for generating a one dimensional scan in real time of the optical image of the object.
Figure 6:
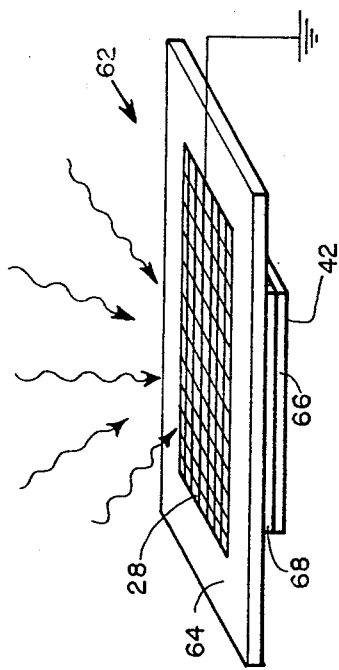
FIG. 6 is a perspective view of the front side of the lithium niobate convolver of FIG. 4.
Figure 5:
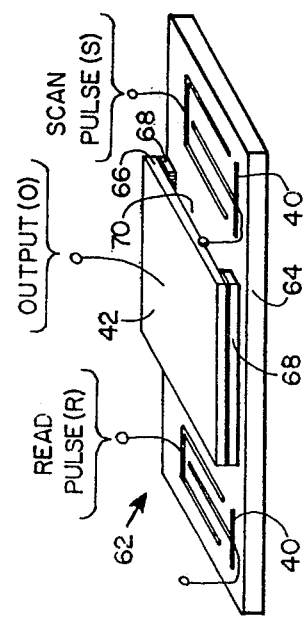
FIG. 5 is a perspective view of the rear side of the lithium niobate convolver of FIG. 4 illustrating the air gap therein.

Referring to FIGS. 4–6, reference numeral 62 generally indicates a conventional lithium niobate convolver. This convolver is illuminated by a light source 10 and lenses 12, 16 in the same manner as hereinbefore described. The object 14 to be imaged is vertically moved with a stepping motor 22 and a rack and pinion gear 20 also described hereinbefore.

The lithium niobate convolver 62 includes a layer 64 of lithium niobate ($LiNbO_3$) that forms an acoustic surface wave delay line. At each end of the niobate layer is a interdigital transducer 40 for inducing an acoustic surface wave into the lithium niobate. Since lithium niobate is optically transparent, the light from the optical system 9 passes through the niobate layer and is incident on an underlying semiconductor layer 66 fabricated from silicon. As hereinbefore described, the semiconductor layer can also be fabricated from indium antimonide (InSb) or gallium arsenide. The silicon layer provides a photosensitive, variable charge density material that produces conductivity perturbations corresponding to intensity variations of the light incident on the convolver. The silicon layer is spaced from the lithium niobate layer by two spacers 68 so that an air gap 70 is created therebetween. The air gap is typically from 1,000 angstroms to 1 micron thick and must be uniformly controlled so that a constant spacing dimension is maintained. The construction and operation of lithium niobate convolvers is further disclosed in the articles cited hereinbefore.

To the conventional lithium niobate convolver 62 hereinbefore described is added an optical grid 28. The grid performs as an optical mask and consists of a plurality of uniformly spaced apart elements each having a spacing L. The grid is deposited directly on the lithium niobate so that it places a spatial periodicity in the light from the object 14. It should be appreciated that the grid locating criteria described hereinbefore are satisfied by this arrangement.

The lithium niobate convolver 62 is driven by a scanning pulse (S) obtained by combining a signal of frequency $\omega_1$ generated by a signal generator 72 with a short pulse generated by a pulse generator 74. The short pulse and the signal of frequency $\omega_1$ are combined together at a mixer 76 and passed to the interdigital transducer 40. The convolver is also driven by a reading pulse (R) obtained by combining a signal of frequency $\omega_2$ generated by a signal generator 78 with a long pulse generated by a pulse generator 80. The long pulse and the signal of frequency $\omega_2$ are combined together at a mixer 82 and passed to the interdigital transducer 40'.

The operation of the lithium niobate convolver 62 (FIG. 4) is similar to the monolithic convolver 26 (FIG. 1) hereinbefore described. The scanning and reading pulses counterpropagate through the niobate delay line 64 and generate electric fields that vary as $\exp j(\omega_1 t - k_1 z)$ and $\exp j(\omega_2 t + k_2 z)$ respectively, where $k_1 = \omega_1/v$, $K_2 = \omega_2/v$ and V is the acoustic surface wave velocity in the lithium niobate. The optical grid 28 imparts a spatial modulation to the intensity of the light incident on the semiconductor body 66 in a simular manner as described in connection with the monolithic convolver. To obtain an output (O) from the convolver, the frequencies of the scanning and reading pulses must be chosen such that $$\omega_1 - \omega_2 \pm Kv = 0 \qquad (7)$$

or $$(\omega_1 - \omega_2) \frac{l}{v} = 2\pi$$

Thus, an output signal is obtained at the sum frequency $\omega_1 + \omega_2$ only when there is light incident on the grid equipped convolver and the dark current is substantially eliminated.

Signal Processing Circuit Providing A One Dimensional Scan

The signal output (O) of the lithium niobate convolver 62 is obtained from an output electrode 42 located on the rear surface of the silicon layer 66. The electrode is a vapor deposited metal film that completely covers the exposed rear surface of the silicon layer. The output electrode is connected to a highpass filter 54, hereinbefore described, and an amplifier 84. The filter eliminates the leakage, scan and read pulses from the output signal. The amplifier is connected to a diode 86 and a resistor 88 that together form a detector circuit that modulates the output of the amplifier. The output of the detector circuit is, in turn, connected to an oscilloscope 58 and provides the intensity modulation input for the oscilloscope. The short pulse obtained from the pulse generator 74 triggers the horizontal sweep of the oscilloscope, and the position signal obtained from the potentiometer 24 provides the vertical input to the oscilloscope. The visual output from the oscilloscope is one single line of the image.

Signal Processing Circuit Providing a Fresnel Transform and A Real Image

Figures 7, 8:
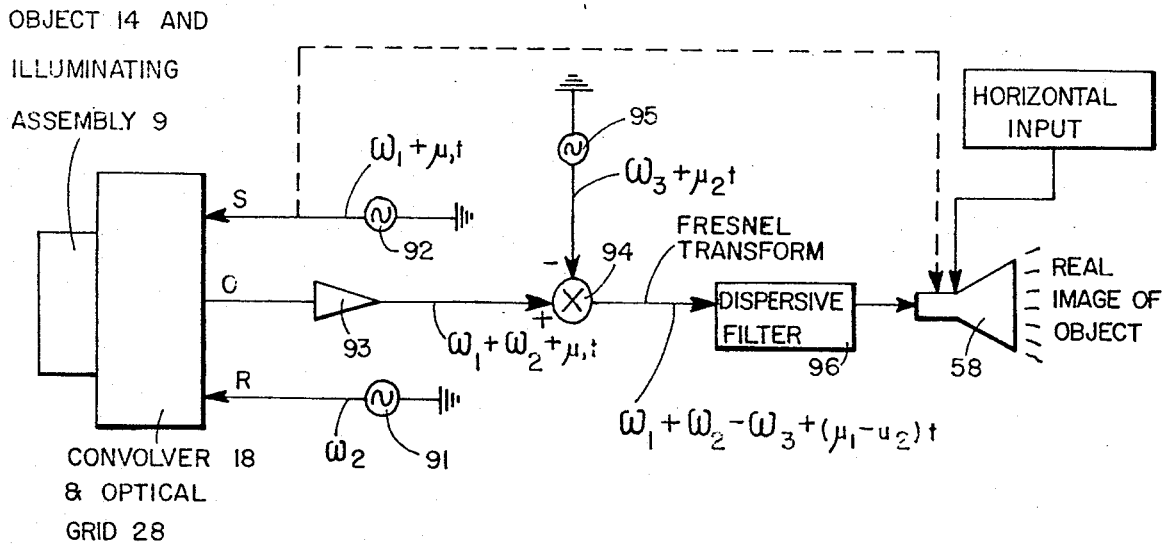
FIG. 7 is a schematic diagram of a third signal generating and processing circuit for generating a Fresnel transform in real time of the optical image of the object.
FIG. 8 is a table comparing the three embodiments of the signal generating and processing circuits of FIGS. 1, 4, and 7.

Referring to FIG. 7, reference numerals 9, 14, and 18 generally indicate, respectively, the illuminating assembly, the object, and one of the convolvers hereinbefore described. The convolver is driven by a read pulse (R) having a frequency $\omega_2$ that is supplied by a signal generator 91. The scan pulse (S) is a linear FM chirp signal having a frequency $\omega_1 + \mu_1 t$ that is obtained from a signal generator 92. The output from the convolver is amplified by an amplifier 93 and passed to a signal mixer 94. Also connected to the signal mixer is a signal generator 95 having a linear FM chirp signal output of frequency $\omega_3 + \mu_2 t$. The output from the signal generator 95 is negatively added at the signal mixer 94 to the output from the amplifier 93. The resulting output of the signal mixer 94 is a signal modulated by the Fresnell transform of the image of the object 14 and having a frequency $\omega = \omega_1 + \omega_2 - \omega_3 + (\mu_1 - \mu_2)t$.

The output signal from the signal mixer 94 is passed to a dispersive filter 96 that delays transmission of the signal as a function of its frequency. The input signal to the dispersive filter is basically a chirp signal $(\mu_1 - \mu_2)t$ that has a frequency component that varies with respect to time. The dispersive filter is matched to the chirp signal input so that within the filter the trailing edge of the chirp signal catches up to its leading edge. The resulting output signal from the dispersive filter is a sharp pulse corresponding to a spot on the image of the object 14. Further description of the operation and construction of dispersive filters can be found in "Radar Signals and Introduction to Theory and Application", Chapter 1, by Mr. C. E. Cooks and Mr. M. Burnfield, Academic Press, New York 1967.

The output signal obtained from the dispersive filter 96 is used to intensity modulate an oscilloscope 58. The horizontal sweep of the oscilloscope is triggered by the leading edge of the scan pulse $\omega_1 + \mu_1 t$. The vertical input to the oscilloscope is obtained in the same manner as hereinbefore described in connection with the monolithic and lithium niobate convolvers. The visual output of the oscilloscope is a reconstructed image of the object 14.

Referring to FIGS. 1, 4, and 7, it should be noted that the signal generating and processing circuit using the short pulse for the scan (S) input (FIG. 4) is limited to the velocity of the scan of the image corresponding to the acoustic velocity of the convolver. In this case the time spent scanning any one spot on the image is relatively short because the pulse width of the short pulse is small. In contrast, the signal generating and processing circuits using chirp signals (FIGS. 1 and 7) can use a chirp having a relatively long pulse length. When a long chirp is propagated along the acoustic delay line, the chirp continuously scans any one spot on the image. In fact, a chirp can be used to scan one spot on the image for a full line time. The net effect is that there is a substantial increase in the time spent obtaining a signal from any one particular spot on the image. Therefore, the total signal energy corresponding to that one spot can be concentrated into a very high signal level and used to modulate the intensity of the oscilloscope 58. This effect results in an increase in the signal to noise ratio by the ratio of the line scan time to the time to scan one spot in the pulsed system. This is $$\frac{\mu_1 + \mu_2}{\mu_1 - \mu_2} N$$

where N is the number of spots.

When the dispersive filter 96 (FIG. 7) is used, the velocity of scan of the image can be slowed to an arbitrarily slow rate and the signal to noise ratio can be arbitrarily increased. The scan velocity can be chosen of arbitrary length because the dispersive filter collapses the chirp output signal from the convolver into one sharp, pulse corresponding to the spot on the object. In other words, as the scan velocity is increasingly slowed, the intensity signal obtained from the dispersive filter becomes larger and larger. Thus, the velocity of scan and the signal to noise ratio can be arbitrarily controlled.

Digital Convolver

Referring to FIG. 9, reference numerals 9, 14, 18, and 28 indicate respectively the illuminating assembly, the object, and one of the convolvers hereinbefore described. The convolver includes an optical grid 28 that places a spatial periodicity into the incident light also as hereinbefore described. The convolver is energized by a scan pulse (S) supplied by a digital signal generator 101 and a read pulse (R) supplied by a second digital signal generator 103. The scan and read pulses are applied directly to two inner-digital transducers (not shown) and generate two counter propagating digitally coded signals in the acoustic surface wave delay line of the convolver. The output (O) from the convolver is passed to a matched filter 105 that is digitally coded to correspond to the output code obtained from the convolver. Thus a digital transform of the image is obtained. The output from the matched filter is a signal pulse corresponding to spot on the image. Thus, when this signal generating and processing circuit is connected to an oscilloscope (not shown), a one-dimensional scan of the image can be obtained without using chirp signals to drive the convolver. The same signal to noise advantages are obtained. Such digital transforms such as the Hadamard transform are of great importance for compressing the bandwidth of signals sent as a digital code.

Color Convolver

Referring to FIG. 10, reference numeral 108 generally indicates a convolver for generating electrical signals corresponding to the colors in the image incident on the convolver. The colored object 14' is a photographic slide transparency and is illuminated by white light from a light source (not shown). The white light passing through the object is filtered into a pattern of colored light corresponding to the image and a bi-convex lens 16 focuses the colored image onto the convolver. The object 14' is vertically moved by the combination of a rack and pinion gear 20 and a stepping motor 22 so that the colored image can be vertically scanned.

The color convolver 108 includes a plurality of filter grids 110, 110' and 110'', each performing in a similar manner as the optical grid 28 hereinbefore described. Each filter grid 110 consists of a plurality of spaced apart, parallel, colored filter strips 112 located on a transparent sheet. A filter strip is an elongate, narrow optical filter that removes a predetermined portion of the spectrum of light incident on the strip. The filter strips are selected to filter out the complimentary color of the color of interest; yellow filter strips are used to filter out blue light, blue strips for yellow light, and cyan for red light. Each filter strip has a uniform width and a uniform spacing of distance L. Between each filter strip the filter grid is transparent to white light, and all of the filter strips on the same filter grid filter out the same portion of the spectrum.

The filter grids 110, 110', and 110'' are rigidly mounted on two transparent sheets 30, 30' that overlie a monolithic convolver. The transparent sheets are selected to pass white light and are positioned so that the filter strips 112 on each grid underlie each other in staggered or stepped relationship. The combined effect on the three filter grids is to place a spatial periodicity into three predetermined portions of the spectrum of light incident on the convolver. In the preferred embodiment these portions are the red, blue, and yellow regions of the spectrum.

The filter grids 110 are supported and spaced away from the convolver sandwich by two sets of elongate spacers 32, 32'. These spacers position the filter grids sufficiently far away from the sandwich so that the filter grids do not influence either the acoustic waves traveling in the piezoelectric layer of the convolver or the electrical fields associated therewith. As hereinbefore described, the filter grids must be positioned sufficiently close to the sandwich so that the spatial periodicities placed in the light are not washed out before the light reaches the semiconductor body.

The multilayered sandwich of the color convolver 108 is constructed and operates in essentially the same manner as the monolithic convolver 26 (FIG. 1) hereinbefore described and like numerals identify the corresponding parts in all figures. Thus, for the purposes of brevity, the description of the color convolver sandwich need not be repeated. It should be noted, however that the transparent gold shielding pad 44 (FIG. 10) underlies a plurality of interdigital transducers 40.

The color convolver 108 is driven by three signal generators 114, 116, 118 that provide signals $\omega_1 + \mu_1 t$, $\omega_2 + \mu_1 t$, and $\omega_3 + \mu_1 t$ respectively to three innerdigital electrodes 40. The color convolver is also driven by a fourth signal generator 120 that generates an output $\omega_0 - \mu_0 t$ that drives the innerdigital electrode 40'. The signals impressed upon the innerdigital electrodes 40 and 40° generate counter propagating, acoustic waves that travel through the piezoelectric layer 34.

The propagation constants of the center frequencies ($t=0$) of the chirped acoustic waves from the signal generators 120, 114, 116 and 118 are respectively:

$$K_{120} = \frac{\omega_0}{v} \qquad K_{116} = \frac{\omega_2}{v}$$

$$K_{114} = \frac{\omega_1}{v} \qquad K_{118} = \frac{\omega_3}{v}$$

where $v$ equals the acoustic velocity wave in the piezoelectric layer 34.

The spacing L between each filter strip 112 on the three filter grids 110 must satisfy the following requirements:

$$|K_{114} - K_{120}| > 0$$

$$|K_{116} - K_{120}| > 0$$

$$|K_{118} - K_{120}| > 0$$

The output from the color convolver 108 comprises three signals $\omega_A$, $\omega_B$ and $\omega_C$ given by the following equations:

$$\omega_A = \omega_0 + \omega_1 + (\mu_1 - \mu_0)t$$

$$\omega_B = \omega_2 + \omega_1 + (\mu_1 - \mu_0)t$$

$$\omega_C = \omega_3 + \omega_0 + (\mu_1 - \mu_1)t$$

It has been observed that the range over which $(\mu_1 - \mu_0)t$ extends can be limited to 5 megahertz whereas $\mu_1 t$ or $\mu_0 t$ can extend over 25 megahertz and 20 megahertz respectively so $(\mu_1 + \mu_0)t$ extends over 45 megahertz. Thus, to obtain a complete separation of the color output signals, it is only necessary for $\omega_1$, $\omega_2$ and $\omega_3$ to be separated by no more than 5 megahertz. The net result is that the colors chosen for the filter strips 112 need not be separated by large differences in period.

Although the monolithic convolver is described as the preferred embodiment of the color convolver, it should be noted that the lithium niobate convolver 62 hereinbefore described can also be used to convolve colored images into electrical signals. In fact, the lithium niobate convolver is functionally interchangeable with the monolithic convolver 26 in all of the embodiments described herein, and each convolver can be used with any of the signal generating and signal processing circuits described in the specification.

Further, it should be noted that each convolver 26, 62, and 108 includes an optical grid 28, 110 that places a spatial periodicity in the illumination incident on the convolver. Moreover, the propagation constants $K_S$, $K_R$ of the counter propagating scan and read input signals for all of the embodiments are selected so that $K_S - K_R \pm K = 0$, where $K$ is an effective wave number of the Fourier component in the semiconductor charge carrier density induced by the spatially modulated light.

Figure 12:
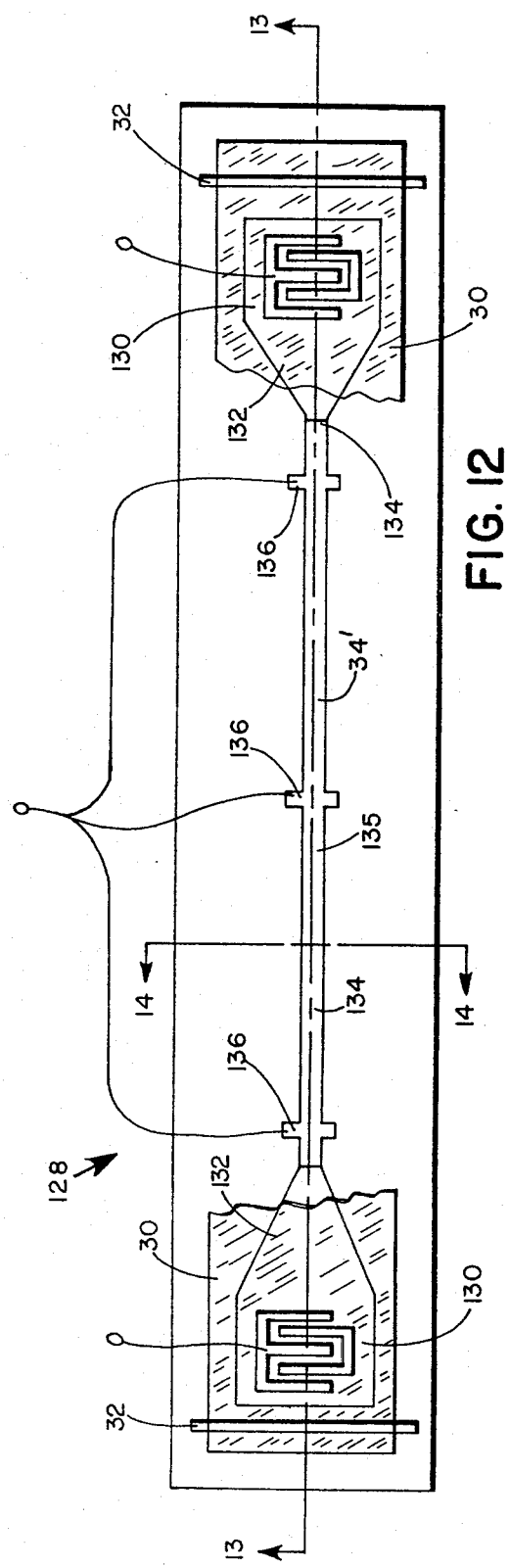
FIG. 12 is a plan view, partially cut away, of an alternative embodiment of the acoustically scanned, optical imaging, monolithic convolver illustrating means for concentrating the acoustic surface waves into a wave guide formed in the piezoelectric layer.
Figure 13:
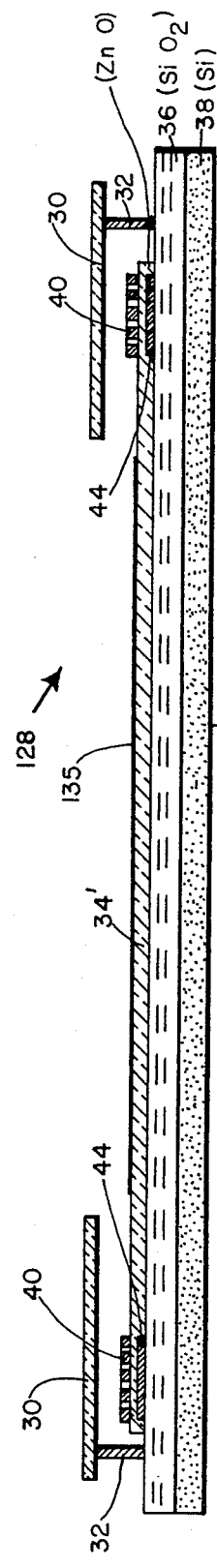
FIG. 13 is a side elevation, in section taken along line 13—13 of FIG. 12 of the monolithic convolver of FIG. 12.
Figure 14:
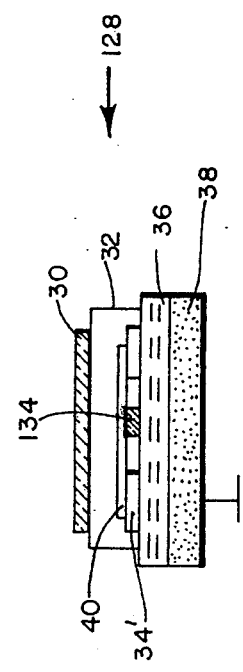
FIG. 14 is an end evolution, in section taken along line 14—14 of FIG. 12 of the monolithic convolver of FIG. 12.

Referring to FIGS. 12, 13 and 14, reference numeral 128 generally indicates a monolithic convolver according to the presend invention with means for concentrating the acoustic waves propagating the piezoelectric layer of the convolver. The convolver in this embodiment includes an optical grid (not shown) supported on a transparent sheet 30 and spaced from the piezoelectric layer by two spacers 32. The convolver sandwich includes a silicon layer 38 surmounted by a silicon dioxide layer 36 and a zinc oxide layer 34'. The counterpropagating acoustic surface waves are induced in the zinc oxide layer by two sets of interdigital transducers 40. With the exception of the zinc oxide layer 34', the construction and operation of the convolver in this embodiment is similar in all respects to the convolvers hereinbefore described.

The zinc oxide layer 34' of the monolithic convolver 128 includes two transducer electrode sections 130, two constriction sections 132 and a wave guide portion 134. The transducer sections are located at the ends of the zinc oxide layer and are proportioned to accomodate conventionally sized interdigital transducers 40. The wave guide portion 134 of the zinc oxide layer is an elongate, narrow, thin strip of piezoelectric material centrally located between the transducer sections. In addition, along the length of the wave guide portion there is deposited a metal film 135 on which is located a plurality of electrical terminal points from which the output signal is obtained from the convolver. The two constriction sections are located between the transducer sections 130 and the wave guide portion 134 and provide means for concentrating the acoustic waves generated by the interdigital transducers. The acoustic waves are concentrated into the reduced cross sectional area of the wave guide portion of the zinc oxide layer by the constriction fabricated in the layer itself.

It has been observed that the acoustic waves propagating under the zinc oxide layer travel at a slower speed than the surface waves located outside of the zinc oxide layer on the silicon substrate. Thus, the portion of the zinc oxide layer having the reduced cross sectional area acts as a wave guide and the electric fields generated by the acoustic waves decrease exponentially in a direction perpendicular to the axis of propagation. These electric fields decrease to an amplitude of approximately $1/e$ in a distance of $\lambda/2\pi$ where $\lambda$ is the acoustic wavelength.

The concentration of acoustic waves in the wave guide portion increases the conversion or output efficiency of the convolver by a factor $1/R^2$ where R is the factor by which the acoustic beam is constricted. The conversion efficiency is increased because nonlinear convolvers generate output signals that depend upon the power of the acoustic waves divided by the cross sectional area of the piezoelectric layer.

In an embodiment that was actually constructed, the piezoelectric layer 34' of the monolithic convolver 128 was chemically etched in order to form the constriction and wave guide sections and the gold film 135 deposited on top of it. In this convolver the acoustic surface wave beam at the interdigital transducers was approximately 1 millimeter wide and have a wavelength of 30 $\mu$m at 100 megahertz. The constriction section 132 was approximately 4 millimeters long and had the shape of a truncated pyramid. The width of the wave guide portion was approximately 1/10th of a millimeter.

It should be noted that the use of a wave guide in the piezoelectric layer is not limited to a monolithic convolver but can be used on any convolver incorporating a nonlinear semiconductor including lithium niobate convolvers.

Thus, although the best modes contemplated for carrying out the present invention have been herein shown and described, it will be apparent that modification and variation may be made without departing from what is regarded to be the subject matter of the invention.

What is claimed is:

1. Apparatus for detecting the information present in the light from an optical image by acoustically scanning the charge carrier density perturbations in a semiconductor body, comprising:
   a. a photosensitive semiconductor body that produces charge carrier density perturbations corresponding to the information in the light that impinges on the semiconductor body, said body having first and second ends;
   b. a piezoelectric layer having first and second ends corresponding to the first and second ends of the semiconductor body, said piezoelectric layer propagates acoustic waves between its first and second ends;

c. an intermediate layer of electrically insulated solid material located between the semiconductor body and the piezoelectric layer and in direct physical contact therewith said intermediate layer controlling the number of surface states at the surface of the semiconductor body;

d. a first input electrode on said piezoelectric layer adjacent to the first end of the semiconductor body for generating a first acoustic wave in one direction past the semiconductor body;

e. a second input electrode on said piezoelectric layer adjacent to the second end of the semiconductor body for generating a second acoustic wave in an opposite direction past the semiconductor body, said first and second acoustic waves nonlinearly interact and scan the charge carrier density perturbations in the semiconductor body; and f. output electrode means on said apparatus for obtaining electrical output signals corresponding to the charge carrier density perturbations in the semiconductor body, whereby the information present in the light is detected.

2. The apparatus of claim 1 wherein said intermediate layer overlies the semiconductor body so that a low density of surface states in the semiconductor body is provided at the innerface therebetween and so that the semiconductor body is protected from contamination during manufacture of the apparatus.

3. The apparatus of claim 1 further including a shielding pad underlying each input electrode and overlying the semiconductor body so that acoustic wave energy loss by interaction with the semiconductor body is reduced.

4. The apparatus of claim 1 wherein the output electrode means includes a first output electrode located on the exposed surface of piezoelectric layer and a second output electrode located on the exposed surface of the semiconductor body.

5. The apparatus of claim 1 wherein said semiconductor body is fabricated from silicon, said piezoelectric layer is fabricated from zinc oxide, and said intermediate layer is fabricated from silicon dioxide.

6. The apparatus of claim 1 wherein said semiconductor body is fabricated from indium antimonide.

7. The apparatus of claim 1 wherein said piezoelectric layer is fabricated from cadmium sulfide.

8. The apparatus of claim 5 wherein the intermediate layer further includes a layer of silicon nitride deposited on the silicon dioxide.

9. The apparatus of claim 5 wherein the intermediate layer further includes a layer of phosphorous glass deposited on the silicon dioxide.

10. A monolithic convolver for converting incident light images into corresponding electrical signals by acoustic scanning, comprising:

a. a photosensitive semiconductor substrate wherein the incident light generates corresponding perturbations in the charge carrier density of the substrate;

b. a transparent piezoelectric layer through which the incident light is transmitted;

c. means for generating counterpropagating acoustic surface waves that travel through the piezoelectric layer and nonlinearly interact, said waves acoustically scan the perturbations in charge carrier density of the substrate;

d. an intermediate layer of electrically insulated solid material sandwiched between the piezoelectric layer and the semiconductor substrate, said piezoelectric layer being located sufficiently close to the substrate that the acoustic surface waves interact with the perturbations in the charge carrier density; and said intermediate layer controlling the number of surface states at the surface of the semiconductor body;

e. means for obtaining electrical output signals from said counterpropagating acoustic surface waves in the piezoelectric layer, whereby the incident light images are converted into corresponding electrical signals.

11. The monolithic convolver of claim 10 further including:

a. an optical grid of uniformly spaced apart opaque elements that place a spatial periodicity $l$ into the light before said light reaches the semiconductor substrate; and b. means for predetermining the frequencies of said counterpropagating waves such that the difference between said frequencies substantially equals an integral multiple of the periodicity introduced into the incident light.

12. An improved acousto-electric convolver for converting incident light images into corresponding electrical signals by acoustic scanning of the type having a photosensitive semiconductor body that produces conductivity perturbations therein corresponding to the incident light images, a piezoelectric layer for counterpropagating acoustic waves past the semiconductor body, means for generating said acoustic waves in the piezoelectric layer, and output means on said piezoelectric layer for converting the acoustic waves into electrical output signals, the improvement comprising:

a. means located in front of the semiconductor body for introducing a spatial periodicity into the incident light before said light reaches the semiconductor body; and b. means for generating said acoustic waves with predetermined frequencies such that the difference between said frequencies substantially equals an integral multiple of the periodicity introduced into the incident light.

13. The apparatus of claim 12 wherein said spatial periodicity introducing means includes an optical grid of uniformly spaced apart opaque elements that block the incident light before it reaches the semiconductor body.

14. The apparatus of claim 12 wherein the spatial periodicity introducing means places a period $l$ into the incident light and the acoustic wave generating means predetermines the waves such that $(\omega_1 - \omega_2) l/V = 2N\pi$ where $N$ is any integer, $V$ is the acoustic velocity of the waves in the piezoelectric layer, and $\omega_1$, $\omega_2$ are the respective frequencies of the acoustic waves.

15. An improved acousto-electric convolver for converting incident light images into corresponding electrical signals by acoustic scanning of the type having a photosensitive semiconductor body that produces conductivity perturbations in the charge carrier density corresponding to the light images, a piezoelectric layer, the semiconductor body, means for generating said acoustic waves in the piezoelectric layer, and output means on said piezoelectric layer for converting the acoustic waves into electrical output signals, the improvement comprising:

a. means located in front of the semiconductor body for introducing a Fourier component with an effective wave number K into the charge carrier density of the semiconductor body; and b. means for generating in the piezoelectric layer said acoustic waves with propagation constants $K_1$ and $K_2$ predetermined such that $$K_1 - K_2 \pm K = 0$$

where K is said effective wave number of the Fourier component.

16. The improved convolver of claim 15 wherein said Fourier component introducing means includes an optical grid of uniformly spaced apart opaque elements, said elements having a spacing of distance $l$ and wherein said propagation constants $K_1$, and $K_2$ are predetermined such that $$K_1 - K_2 = \frac{2\pi}{l}.$$

17. The improved convolver of claim 15 further including means for spacing said Fourier component introducing means from the piezoelectric layer such that said introducing means does not electrically interact with said acoustic waves.

18. A method for converting incident light images into corresponding electrical signals by acoustic scanning, comprising the steps of:

a. impinging the incident light onto a photosensitive semiconductor body wherein conductivity perturbations are produced corresponding to the image;

b. introducing a spatial periodicity of period $l$ into the incident light before said light impinges on the semiconductor body;

c. scanning the semiconductor body with nonlinearly interacting counterpropagating acoustic waves having predetermined frequencies, said waves correspondingly interact in accordance with the charge carrier density perturbations in the semiconductor body and thereby produce electrical output signals corresponding to the incident light images; and d. predetermining the frequencies of the acoustic waves so that the difference between said frequencies substantially equals an integral multiple of the periodicity $l$ introduced into the incident light.

19. The method of claim 18 wherein the step of scanning the semiconductor body, includes:

a. propagating a first acoustic wave of frequency $\omega_1$ proximate to the semiconductor body in a plane parallel therewith and from one end thereof; and b. counterpropagating a second acoustic wave of frequency $\omega_2$ proximate to the semiconductor body in a plane parallel to the body and from an end thereof opposite to said first acoustic wave.

20. The method of claim 19 wherein the step of predetermining the frequencies of the acoustic waves includes predetermining said frequencies $\omega_1$, $\omega_2$ such that $$(\omega_1 - \omega_2) \frac{l}{V} = 2\pi N$$

where $V$ is the acoustic velocity of the waves; $l$ is the periodicity, and $N$ is any integer.

21. The method of claim 18 wherein the step of introducing a spatial periodicity into the incident light includes interrupting a portion of the light with an opaque grating means before said light impinges on the semiconductor body.

22. An improved acousto-electric convolver for converting incident light images into corresponding electrical signals by acoustic scanning of the type having a photosensitive semiconductor body that produces charge carrier perturbations therein corresponding to the incident light images, a piezoelectric layer for counterpropagating acoustic waves past the semiconductor body, means for generating said acoustic waves in the piezoelectric layer, and output means on said piezoelectric layer for converting the acoustic waves into electrical output signals, the improvement comprising:

a. means located in front of the semiconductor body for introducing at least two spatial periodicities into the incident light before said light reaches the semiconductor body; and b. means for generating said acoustic waves with predetermined frequencies such that the differences between said frequencies substantially equal integral multiples of the periodicities introduced into the incident light.

23. The convolver of claim 22 wherein said periodicity introducing means includes at least two filter grids each having a plurality of uniformly spaced apart filter strips thereon that block a predetermined portion of the spectrum of incident light before said light reaches the semiconductor body.

24. The convolver of claim 22 wherein said acoustic wave generating means, includes:

a. at least two signal generators that propagate in the same direction waves having propagation constants $K_1$ and $K_2$; and b. at least one signal generator that propagates in an opposite direction a wave having a propagation constant $K_3$, the frequencies of the aforesaid waves are predetermined such that:

$$|K_1 - K_3| > 0$$

$$|K_2 - K_3| > 0$$

25. An improved apparatus for detecting the information present in the light from an optical image of the type having a photosensitive semiconductor body that produces charge carrier density perturbations corresponding to the information in the light that impinges on the body, a piezoelectric layer having first and second ends for counterpropagating interacting acoustic waves past the semiconductor body, a first input electrode on said piezoelectric layer adjacent to said first end for generating a first acoustic wave in one direction past the semiconductor body, a second input electrode on said piezoelectric layer adjacent to said second end for generating a second acoustic wave in an opposite direction past the semiconductor body, and output electrode means on said apparatus for converting the interacting acoustic waves into electrical output signals corresponding to the charge carrier density perturbations in the semiconductor body, the improvement comprising:

a. means located in front of the semiconductor body for introducing a spatial periodicity into the incident light before said light reaches the semiconductor body;

b. a first signal generator for generating a relatively short scanning pulse;

c. a second signal generator for generating a signal of frequency $\omega_1$;

d. first mixer means connected to the first and second signal generators for combining the relatively short scanning pulse from the first signal generator with the signal of frequency $\omega_1$ from the second signal generator, the output of said first mixer means being connected to said first input electrode;

e. a third signal generator for generating a relatively long reading pulse;

f. a fourth signal generator for generating a signal of frequency $\omega_2$;

g. second mixer means connected to the third and fourth signal generator for combining the relatively long reading pulse from the third signal generator with the signal of frequency $\omega_2$ from the fourth signal generator, the output of said second mixer means being connected to said second input electrode, said frequencies $\omega_1$, $\omega_2$ are predetermined such that the difference between the frequencies substantially equals an integral multiple of the periodicity introduced into the light by the periodicity introducing means.

26. The apparatus of claim 25 further including:

a. means connected to the output electrode means for intensity modulating the scan of an oscilloscope; and b. means connected to the oscilloscope for driving the scan of said oscilloscope in correspondence with the motion of the optical image, whereby the visual output of the oscilloscope is a one dimensional scan of the optical image.

27. An improved apparatus for detecting the information present in the light from an optical image of the type having a photosensitive semiconductor body that produces charge carrier density perturbations corresponding to the information in the light that impinges on the body, a piezoelectric layer having first and second ends for counterpropagating interacting acoustic waves past the semiconductor body, a first input electrode on said piezoelectric layer adjacent to said first end for generating a first acoustic wave in one direction past the semiconductor body, a second input electrode on said piezoelectric layer adjacent to said second end for generating a second acoustic wave in an opposite direction past the semiconductor body, and output electrode means on said apparatus for converting the interacting acoustic waves into electrical output signals corresponding to the charge carrier density perturbations in the semiconductor body, the improvement comprising:

a. means located in front of the semiconductor body for introducing a spatial periodicity into the incident light before said light reaches the semiconductor body;

b. first means connected to the first input electrode for generating thereat a signal of frequency $\omega_1 + \mu t$ where $\omega_1$ is the continuous frequency component of the signal and $\mu t$ is a chirp signal having a chirp rate $\mu$ over time $t$;

c. second means connected to the second input electrode for generating thereat a signal of frequency $\omega_2 - \mu t$ where $\omega_2$ is the continuous frequency component of the signal and $\mu t$ is a chirp signal having a chirp rate $\mu$ over time $t$, said signal frequencies $\omega_1$, $\omega_2$ are predetermined such that the difference between the frequencies substantially equals an integral multiple of the periodicity introduced into the light by the periodicity introducing means; and d. output electrode means connected to said apparatus having an output signal of frequency $\omega_1 + \omega_2$ modulated by the Fourier transform of the image.

28. The apparatus of claim 27 further including:

a. spectrum analyzer means connected to the output electrode means for intensity modulating the scan of an oscilloscope; and b. means connected to the oscilloscope for driving the scan of said oscilloscope in correspondence with the motion of the optical image, whereby the visual output of the oscilloscope is a Fourier transform of the image.

29. An improved apparatus for detecting the information present in the light from an optical image of the type having a photosensitive semiconductor body that produces conductivity perturbations corresponding to the information in the light that impinges on the body, a piezoelectric layer having first and second ends for propagating interacting acoustic waves past the semiconductor body, a first input electrode on said piezoelectric layer adjacent to said first end for generating a first acoustic wave in one direction past the semiconductor body, a second input electrode on said piezoelectric layer adjacent to said second end for generating a second acoustic wave in an opposite direction past the semiconductor body, and output electrode means on said apparatus for converting the interacting acoustic waves into electrical output singals corresponding to the conductivity perturbations in the semiconductor body, the improvement comprising:

a. means located in front of the semiconductor body for introducing a spatial periodicity into the incident light before said light reaches the semiconductor body;

b. first means connected to said first input electrode for generating thereat a signal of frequency $\omega_1 + \mu_1 t$ where $\omega_1$ is a signal of constant frequency and $\mu_1 t$ is a chirp signal having a chirp rate of $\mu_1$ over time $t$;

c. second means connected to said second input electrode for generating thereat a signal of frequency $\omega_2$, said signal frequencies $\omega_1$, $\omega_2$ are predetermined such that the difference between the frequencies substantially equals an integral multiple of the periodicity introduced into the light by the periodicity introducing means;

d. third means for generating a signal of frequency $\omega_3 + \mu_2 t$, where $\omega_3$ is a signal of constant frequency and $\mu_2 t$ is a chirp signal having a chirp rate of $\mu_2$ over time $t$; and e. mixing means connected to both said output electrode means and said third signal generator means for subtracting the output signal obtained from the third signal generator means from the output signal obtained from the output electrode means, whereby said mixing means has an output signal that is modulated by the Fresnel transform of the optical image.

30. The apparatus of claim 29 further including:

a. dispersive filter means connected to the output of said mixer means for intensity modulating the scan of an oscilloscope; and b. means connected to the oscilloscope for driving the scan said oscilloscope in correspondence with the motion of the optical image, whereby the visual output of the oscilloscope is the optical image itself.

31. An improved apparatus for detecting the information present in the light from an optical image of the type having a photosensitive semiconductor body that produces charge carrier density perturbations corresponding to the information in the light that impinges on the body, a piezoelectric layer having first and second ends for counterpropagating interacting acoustic waves past the semiconductor body, a first input electrode on said piezoelectric layer adjacent to said first end for generating a first acoustic wave in one direction past the semiconductor body, a second input electrode on said piezoelectric layer adjacent to said second end for generating a second acoustic wave in an opposite direction past the semiconductor body, and output electrode means on said apparatus for converting the interacting acoustic waves into electrical output signals corresponding to the charge carrier density perturbations in the semiconductor body, the improvement comprising:
  a. means located in front of the semiconductor body for introducing a Fourier component with an effective wave number K into the charge carrier density of the semiconductor body;
  b. first means connected to the first input electrode for generating thereat a first digitally coded signal, said first digital signal having a propagation constant $K_1$ in said piezoelectric layer; and
  c. second means connected to the second input electrode for generating thereat a second digitally coded signal, said second digital signal having a propagation constant $K_2$ in said piezoelectric layer, said propagation constants $K_1$ and $K_2$ being predetermined so that $$K_1 - K_2 \pm K = 0$$

where $K$ is said effective wave number of the Fourier component.

32. The apparatus of claim 31 further including:
  a. matched filter means connected to the output electrode means and digitally coded to correspond to the output therefrom such that the output from said matched filter means is a signal pulse corresponding to a spot on the image.

33. Apparatus for detecting the information present in the light from an optical image by acoustically scanning the charge carrier density perturbations in a semiconductor body, comprising:
  a. a photosensitive semiconductor body that produces charge carrier density perturbations corresponding to the information in the light that impinges on the semiconductor body, said body having first and second ends;
  b. a piezoelectric layer having first and second ends corresponding to the first and second ends of the semiconductor body, said piezoelectric layer propagates acoustic waves between its first and second ends;
  c. an intermediate layer located between the semiconductor body and the piezoelectric layer and in direct physical contact therewith;
  d. a first input electrode on said piezoelectric layer adjacent to the first end of the semiconductor body for generating a first acoustic wave in one direction past the semiconductor body;
  e. a second input electrode on said piezoelectric layer adjacent to the second end of the semiconductor body for generating a second acoustic wave in an opposite direction past the semiconductor body, said first and second acoustic waves nonlinearly interact and scan the charge carrier perturbations in the semiconductor body;
  f. output electrode means on said apparatus for obtaining electrical output signals corresponding to the conductivity perturbations in the semiconductor body, whereby the information present in the light is detected; and
  g. means located proximate to the input electrodes for concentrating the first and second acoustic waves propagating in the piezoelectric layer.

34. The apparatus of claim 33 wherein the means for concentrating the propagating acoustic waves is a constriction fabricated in the piezoelectric layer of the apparatus.

35. The apparatus of claim 33 wherein the piezoelectric layer includes:
  a. first and second electrode sections for mounting said first and second input electrodes;
  b. a wave guide portion centrally located between said first and second electrode sections wherein the first and second concentrated acoustic waves nonlinearly interact; and
  c. first and second wave constriction sections located between the first and second electrode sections and the wave guide portion wherein said first and second acoustic waves generated by the input electrodes are concentrated for propagation in the wave guide portion.

36. An improved acousto-electric convolver for converting incident light images into corresponding electrical signals by acoustic scanning of the type having a photosensitive semiconductor body that produces conductivity perturbations therein corresponding to the incident light images, a piezoelectric layer for counterpropagating acoustic waves past the semiconductor body, means for generating said acoustic waves in the piezoelectric layer, and output means on said piezoelectric layer for converting the acoustic waves into electrical output signals, the improvement comprising:
  a. means located in front of the semiconductor body for introducing a spatial periodicity into the incident light before said light reaches the semiconductor body;
  b. means for generating said acoustic waves with predetermined frequencies such that the difference between said frequencies substantially equals an integral multiple of the periodicity introduced into the incident light; and
  c. means located proximate to the acoustic wave generating means for concentrating the acoustic waves propagating in the piezoelectric layer.

37. The apparatus of claim 36 wherein the means for concentrating the acoustic waves is a constriction fabricated in the piezoelectric layer of the apparatus.

* * * * *